US010313586B2

(12) United States Patent
Hoshina (10) Patent No.: US 10,313,586 B2
(45) Date of Patent: Jun. 4, 2019

(54) ELECTRONIC APPARATUS, METHOD FOR CONTROLLING THE SAME, AND STORAGE MEDIUM

(71) Applicant: CANON KABUSHIKI KAISHA, Tokyo (JP)

(72) Inventor: Takayuki Hoshina, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 15/603,253

(22) Filed: May 23, 2017

(65) Prior Publication Data

US 2017/0353659 A1     Dec. 7, 2017

(30) Foreign Application Priority Data

Jun. 1, 2016   (JP) ................... 2016-109669

(51) Int. Cl.
  *H04N 5/232*   (2006.01)
  *G06F 3/14*    (2006.01)
  *G06F 1/3234*  (2019.01)
(52) U.S. Cl.
  CPC ....... *H04N 5/23241* (2013.01); *G06F 1/3265* (2013.01); *G06F 3/1423* (2013.01); *H04N 5/23293* (2013.01); *G09G 2330/021* (2013.01); *G09G 2330/022* (2013.01); *G09G 2354/00* (2013.01)

(58) Field of Classification Search
None
See application file for complete search history.

(56) References Cited

U.S. PATENT DOCUMENTS

| 2011/0050974 A1* | 3/2011 | Nakai | ................. | H04N 5/2251 |
| | | | | 348/333.01 |
| 2014/0365981 A1* | 12/2014 | Ranney | ................. | G06F 1/1626 |
| | | | | 715/863 |

FOREIGN PATENT DOCUMENTS

| JP | 2001-339627 A | 12/2001 |
| JP | 2008-252526 A | 10/2008 |

* cited by examiner

*Primary Examiner* — Mark T Monk
(74) *Attorney, Agent, or Firm* — Canon U.S.A., Inc. IP Division (57) ABSTRACT

Display is appropriately switched between an EVF display and a rear display of a camera based on proximity detection. A proximity detection unit detects proximity of a user viewing through the EVF. An orientation detection unit detects an orientation of the camera main body. If the proximity detection unit detects proximity within a predetermined threshold, a system control unit switches display to display of the EVF. If the orientation detection unit detects a predetermined motion, the system control unit changes a threshold of the proximity detection to a value indicating a distance far from the EVF.

14 Claims, 6 Drawing Sheets

FIG.5A
INITIAL STATE

FIG.5B
SWING-UP MOTION IS DETECTED

FIG.5C
DRAWING MOTION IS DETECTED

FIG.5D
IF VIEWING WINDOW IS DETECTED TO BE VIEWED THROUGH WITHIN T2, SWITCH TO EVF DISPLAY

ELECTRONIC APPARATUS, METHOD FOR CONTROLLING THE SAME, AND STORAGE MEDIUM

BACKGROUND

Field

The present disclosure relates to an electronic apparatus, a method for controlling the same, and a storage medium.

Description of the Related Art

Some electronic apparatuses equipped with a display device detect proximity of a user based on detection information from a human detection sensor, such as a proximity detection unit built into the apparatuses, and control the display device based on the detected proximity.

For example, recent digital cameras include a liquid crystal monitor on their rear portion in addition to an electronic viewfinder (EVF) and are configured to be able to use both the EVF and the liquid crystal monitor to check composition of objects. Such a configuration usually enables image display of either the EVF or liquid crystal monitor in view of reduction in power consumption. In other words, if the user views through a viewing window of the EVF, the image display on the EVF is enabled and liquid crystal monitor's image display is turned off. If the viewing window of the EVF is not closed and external light is incident thereon, the image display on the EVF is turned off and the liquid crystal monitor's image display is enabled. For such a control, a proximity sensor for detecting proximity of an object, e.g., the photographer's face, to the viewing window of the EVF is arranged on or near the viewing window.

Japanese Patent Application Laid-Open No. 2008-252526 discusses a television set that turns on its power if a light detection unit and a human detection unit determine that lighting is on and a person is present in the vicinity of the television set.

Japanese Patent Application Laid-Open No. 2001-339627 discusses an imaging apparatus using an EVF. The imaging apparatus turns on power to the imaging apparatus's display device if a proximity sensor detects that the EVF is being viewed through. The EVF can thus be powered off to reduce power consumption in situations where a display image of the EVF is not viewed by a user.

In general, display devices need a plurality of types of positive and negative voltages to drive their display elements. To reduce power consumption, the generation of such driving voltages can be stopped during periods in which no user is needed. It takes some time for a boosting or step-down operation for generating a driving voltage to complete and for the driving voltage to stabilize. An image display of a display device is typically enabled after stabilization of the driving voltages. Even if the proximity of a user is detected by a proximity detection unit, it can be difficult to immediately provide stable display on the display device.

The proximity detection unit can erroneously detect proximity and perform control on the display device even if the user is not operating the electronic apparatus. If the user walks with an electronic apparatus, such as an imaging apparatus, around the user's neck, the imaging apparatus swings and the back of the imaging apparatus can come into contact with and move away from the user's abdomen. If the back of the imaging apparatus comes into contact with or approaches the user's abdomen, the proximity detection unit detects the proximity. If the back of the imaging apparatus moves away from the user's abdomen, the proximity detection unit does not detect proximity. In other words, when the user walks with an electronic apparatus that detects proximity of a human body and controls a display device based on the detected proximity, the user's motion can result in the electronic apparatus can repeatedly switch from detecting proximity to not detecting proximity. This causes the display device to repeatedly drive (turn-on) and stop (turn-off), resulting in unnecessary power consumption.

SUMMARY OF THE INVENTION

The present disclosure is directed to an electronic apparatus that more suitably performs processing based on proximity detection and a method for controlling the electronic apparatus.

According to an aspect of the embodiments, an electronic apparatus includes a motion detection unit configured to detect a motion of the electronic apparatus, a proximity detection unit configured to detect proximity of an object, a display unit configured to be viewable when view through an eyepiece part, and a control unit configured to, in a case where proximity detection information from the proximity detection unit corresponds to a distance closer than a threshold, perform control to start display on the display unit, and configured to, in a case where the motion detection unit detects a first motion, change the threshold to a value corresponding to a greater distance.

According to another aspect of the embodiments, an electronic apparatus includes a motion detection unit configured to detect a motion of the electronic apparatus, a proximity detection unit configured to detect proximity of an object, a display unit configured to be viewable when viewed through an eyepiece part, and a control unit configured to, in a case where proximity detection information from the proximity detection unit corresponds to a distance closer than a threshold, perform control to start display on the display unit, and configured to, in a case where the motion detection unit detects a second motion, stop a detection operation of the proximity detection unit or stop the control of the display on the display unit based on a detection result from the proximity detection unit.

Further features will become apparent from the following description of exemplary embodiments with reference to the attached drawings.

DESCRIPTION OF THE EMBODIMENTS

An exemplary embodiment will be described in detail below with reference to the drawings.

Figure 1:
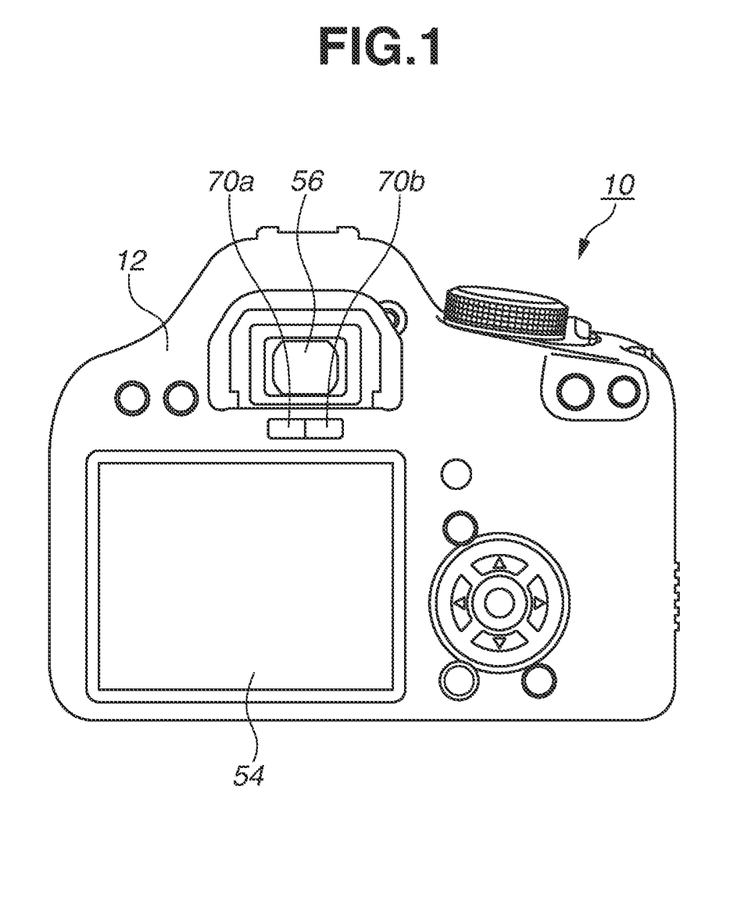
FIG. 1 is a rear view of an exemplary embodiment.
Figure 2:
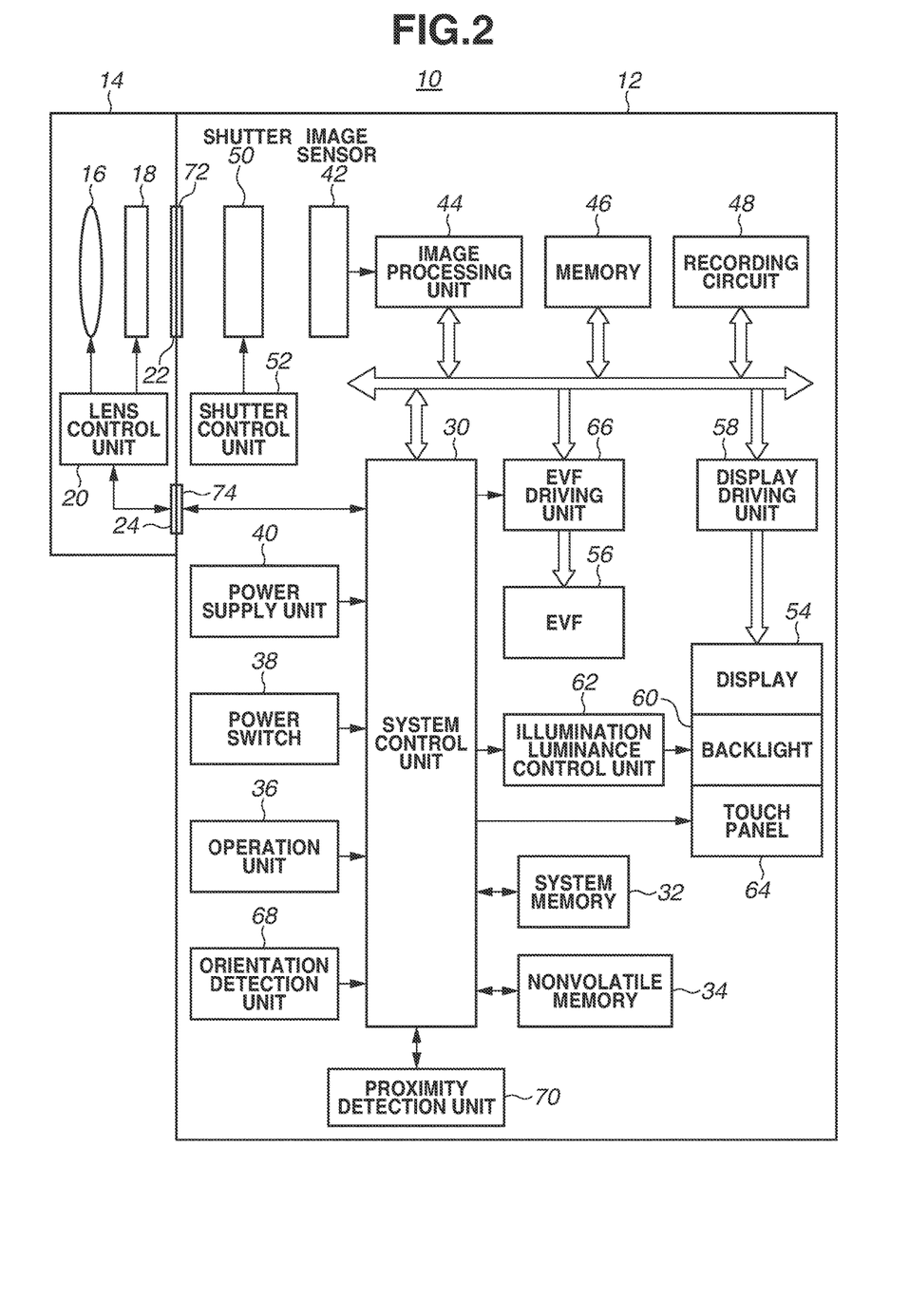
FIG. 2 is a schematic block diagram of the exemplary embodiment.

FIG. 1 is a rear view of an imaging apparatus that is an exemplary embodiment of the electronic apparatus. FIG. 2 is a schematic block diagram illustrating a configuration of the imaging apparatus.

An imaging apparatus 10 illustrated in FIGS. 1 and 2 includes a camera main body 12 and a lens unit 14 that is detachable from the camera main body 12.

The lens unit 14 includes a lens 16, a diaphragm 18, and a lens control unit 20. The lens control unit 20 controls the lens 16 and the diaphragm 18 based on a control signal from a system control unit 30 of the camera main body 12. The lens unit 14 is fixed to the camera main body 12 by mechanically coupling a mount 22 of the lens unit 14 with a mount 72 of the camera main body 12. With the lens unit 14 fixed to the camera main body 12, a connector 24 of the lens unit 14 is electrically connected to a connector 74 of the camera main body 12. The lens control unit 20 communicates with the system control unit 30 via the connectors 74 and 24.

The lens control unit 20 controls the entire lens unit 14. The lens control unit 20 includes a built-in memory that stores constants, variables, and programs for operation. The lens control unit 20 also includes a nonvolatile memory that stores identification information such as a number unit to the lens unit 14, management information, functional information such as a maximum aperture value, a minimum aperture value, and a focal length, and past and present setting values. The lens control unit 20 includes an automatic focusing (AF) function of changing an image forming position of an object image incident on an image sensor 42 by controlling focusing of the lens 16 based on a focusing state measured by an image processing unit 44. The lens control unit 20 also includes a function of controlling the aperture value of the diaphragm 18 and the zooming of the lens 16.

A configuration of the camera main body 12 will now be described. The system control unit 30 includes a central processing unit (CPU) that controls the entire imaging apparatus 10 using a system memory 32. An electrically erasable and recordable nonvolatile memory 34 stores setting values, an imaging mode, and various types of correction data. Examples of the setting values include various parameters and an International Organization for Standardization (ISO) speed. The nonvolatile memory 34 also stores a computer program that runs on the system control unit 30.

An operation unit 36 is an operation unit for inputting various types of predetermined operation instructions into the system control unit 30. The operation unit 36 includes any one of a switch, a dial, a touch panel, a line of sight detection pointing device, or a voice recognition device, or any combination of thereof.

A power switch 38 is used to power on/off the imaging apparatus 10 and to make mode switch settings.

A power supply unit 40 includes a battery, a battery detection unit, a current detection unit, a protection circuit, a direct-current-to-direct-current (DCDC) converter, and a low dropout (LDO) regulator. The power supply unit 40 supplies desired power supply voltages generated by the DCDC converter to the components of the imaging apparatus 10 for desired periods based on instructions from the system control unit 30. The power supply unit 40 detects the presence or absence of an attached battery, and the type and remaining level of the battery. When an overcurrent is detected, the power supply unit 40 cuts off the voltage outputs to protect load circuits.

The image sensor 42 is a sensor for converting an optical image formed by the lens unit 14 and incident on its imaging plane into an image signal. The image processing unit 44 performs predetermined calculation processing on the image signal output from the image sensor 42, and applies pixel processing based on the calculation result to generate video data of a predetermined video signal format. Examples of the pixel processing include pixel interpolation processing, color conversion processing, and white balance processing. The image processing unit 44 temporarily stores the generated video data in a memory 46. The image processing unit 44 includes a Joint Photographic Experts Group (JPEG) image compression function.

A recording circuit 48 is a circuit for recording the video data temporarily stored in the memory 46 on a removable recording medium, such as a semiconductor memory, and reproducing video data from the recording medium.

The system control unit 30 determines the aperture value of the diaphragm 18 and shutter speed of a shutter 50 based on exposure information from the image processing unit 44. The system control unit 30 controls the shutter 50 to the determined shutter speed via a shutter control unit 52, and controls the diaphragm 18 to the determined aperture value via the lens control unit 20. The system control unit 30 controls image display of the video data temporarily stored in the memory 46 on a display 54 and an EVF 56.

As illustrated in FIG. 1, the display 54 size can occupy a large area on the back of the camera main body 12. The EVF 56 is a display unit arranged in a viewing window located above the display 54. A screen of the EVF 56 is viewed by viewing through the viewing window. An output lens window 70a and a light receiving lens window 70b of a proximity detection unit 70 are arranged directly below the viewing window. The proximity detection unit 70 detects a state of proximity or a degree of the same up to a view-through state in which the user (photographer) presses an eye against the viewing window.

The display 54 includes an organic electroluminescent (EL) display or a liquid crystal display. For example, the display 54 includes a liquid crystal display that includes a transmissive liquid crystal panel of a thin film transistor active matrix driving method. Each display element of the liquid crystal panel includes red, green, and blue (RGB), three sub pixels including color filters of the three colors RGB arranged on top of liquid crystals. Polarization filters for suppressing the oscillation directions of light to one direction are arranged on bottom of the liquid crystals and on top of the color filters. A display driving unit 58 adjusts voltages applied to the respective sub pixels, whereby the transmittance of light emitted from a backlight 60 can be adjusted to display a desired image in gradations.

If a self-luminescence display such as an organic EL display is employed as the display 54, the backlight 60 is not needed.

The display driving unit 58 supplies a driving timing signal for driving the display 54. The display driving unit 58 includes a built-in boosting unit and step-down unit for generating driving voltages of the display elements of the display 54. The display driving unit 58 applies the generated driving voltages to the display 54 in synchronization with the driving timing signal.

An illumination luminance control unit 62 can adjust the illumination luminance of the backlight 60 stepwise. The illumination luminance control unit 62 linearly changes the illumination luminance by limiting the amount of current applied to the light emitter of the backlight 60 based on a pulse width moderation (PWM) control signal from the system control unit 30. The backlight 60 includes a light source such as a light-emitting diode (LED), a fluorescent tube, and an organic EL element, and a light guide plate, a reflection plate, and a diffusion plate for implementing plane emission of light output from the light source. The backlight 60 is fixed to a rear surface of the display 54 and projects light on the rear surface of the display 54.

A touch panel 64 is arranged on a top surface of the display 54. Examples of a touch detection method of the touch panel 64 include a resistive method, a capacitive method, and an optical method. The present exemplary embodiment can use any of these methods.

The EVF 56 includes a flat display, such as an organic EL display, and a liquid crystal display. As illustrated in FIG. 1, the EVF 56 is arranged inside the viewing window in an upper portion of the rear surface of the camera main body 12.

The organic EL display of the EVF 56 includes a built-in organic EL panel of the thin film transistor active matrix driving method. Each display element of the organic EL panel includes R, G, and B, three organic EL elements. The organic EL elements emit light when a voltage is applied thereto. Driving voltages applied from an EVF driving unit 66 to the respective organic EL elements can be adjusted to control the amounts of light in the respective colors and display a desired image in gradations.

The EVF driving unit 66 supplies a driving timing signal for driving the EVF 56 to the EVF 56. The EVF driving unit 66 includes a built-in boosting unit and step-down unit for generating the driving voltages of the EVF 56. The EVF driving unit 66 applies the generated driving voltages to the EVF 56 in synchronization with the driving timing signal.

The system control unit 30 can display a menu screen, an image, and live view display on both the display and the EVF 56. The system control unit 30 independently controls display on the display 54 and that of the EVF 56 on/off based on operations from the operation unit 36. The system control unit 30 controls display switching between the display 54 and the EVF 56 based on a detection result from a proximity detection unit 70.

An orientation detection unit 68 detects orientation of the camera main body 12 with respect to the direction of gravity. Based on the orientation detected by the orientation detection unit 68, the system control unit 30 determines in what orientation of the camera main body 12 a captured image is captured. The system control unit adds direction information based on the orientation detected by the orientation detection unit 68 to an image file of the captured image, and, if needed, rotates and records the captured image in a specified direction. The orientation detection unit 68 includes an acceleration sensor.

The proximity detection unit 70 is arranged below the EVF 56. The proximity detection unit 70 detects a state of proximity or a degree of the same (proximity distance) up to a view-through state in which the user presses an eye against the viewing window. If the system control unit 30 obtains proximity detection information from the proximity detection unit 70, the system control unit 30 performs display switching to stop display on the display 54 and enable display on the EVF 56.

The proximity detection unit 70 includes, for example, an infrared emission element and a light receiving circuit. The proximity detection unit 70 emits infrared rays at regular intervals and measures the amount of reflected light to detect the presence or absence of an object in a predetermined position. The proximity detection unit 70 externally emits output infrared rays (probe light) from the infrared emission element through an output lens window 70a (FIG. 1), and receives reflected light of the probe light from the object, e.g., the photographer, through a light receiving lens window 70b (FIG. 1). The proximity detection unit 70 can detect a distance between the camera main body 12 and the photographer with a plurality of levels of detection thresholds.

Figure 3:
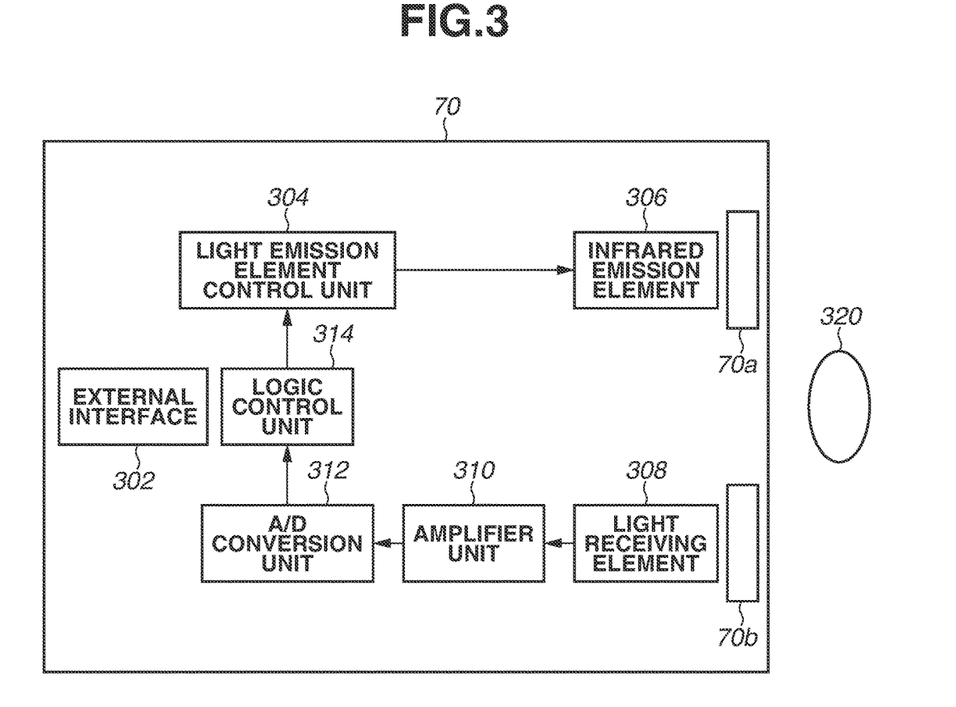
FIG. 3 is a schematic block diagram of a proximity detection unit.

FIG. 3 illustrates a schematic block diagram of the proximity detection unit 70. An external interface 302 of the proximity detection unit 70 is connected to the system control unit 30. The system control unit 30 controls the proximity detection unit 70 and receives a proximity detection result from the proximity detection unit 70.

A light emission element control unit 304 can drive an infrared emission element 306 and increase and decrease its driving current. If the driving current increases, a light emission intensity of the infrared emission element 306 increases. Output light of the infrared emission element 306 is externally emitted via the output lens window 70a.

The light radiated from the output lens window 70a is reflected by an object 320. The reflected light is collected through the light receiving lens window 70b and incident on a light receiving element 308. An amplifier unit 310 amplifies an output electrical signal of the light receiving element 308. An analog-to-digital (A/D) conversion unit 312 converts an analog output signal of the amplifier unit 310 into a digital signal.

A logic control unit 314 controls turn-on/off timing of the infrared emission element 306, and generates an accumulation/reset timing signal of the light receiving element 308. The logic control unit 314 determines the proximity distance or the degree of proximity by comparing an output value of the A/D conversion unit 312 with the plurality of detection thresholds. The logic control unit 314 can change the detection threshold between the plurality of levels. The logic control unit 314 notifies the system control unit 30 of a proximity determination result via the external interface 302.

The object 320 is basically a part of the face or body of the user of the imaging apparatus 10, i.e., the photographer. The proximity detection unit 70 detects proximity of any object that reflects the light radiated from the output lens window 70a.

Figure 4A:
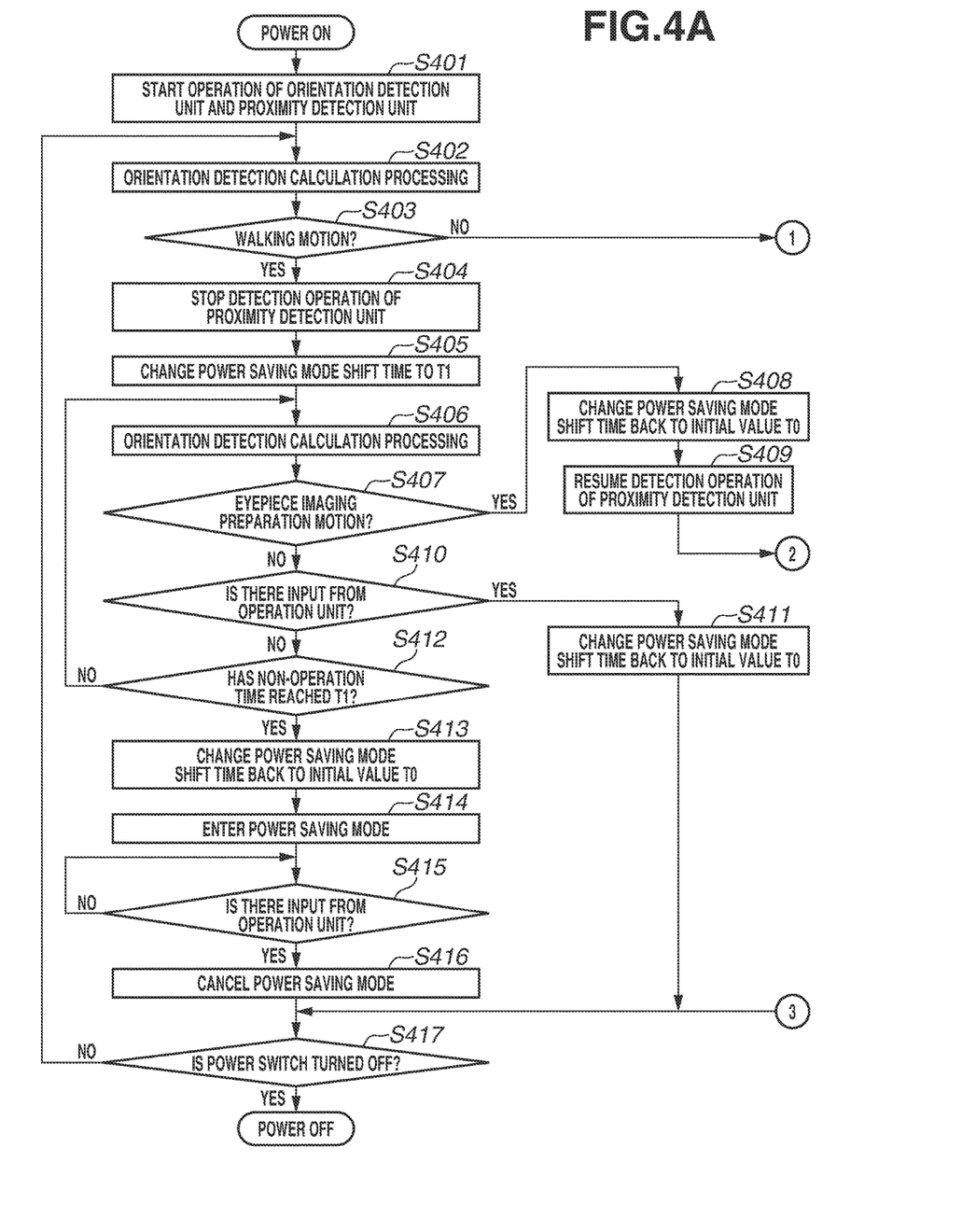
FIG. 4A is an operation flowchart according to the exemplary embodiment.
Figure 4B:
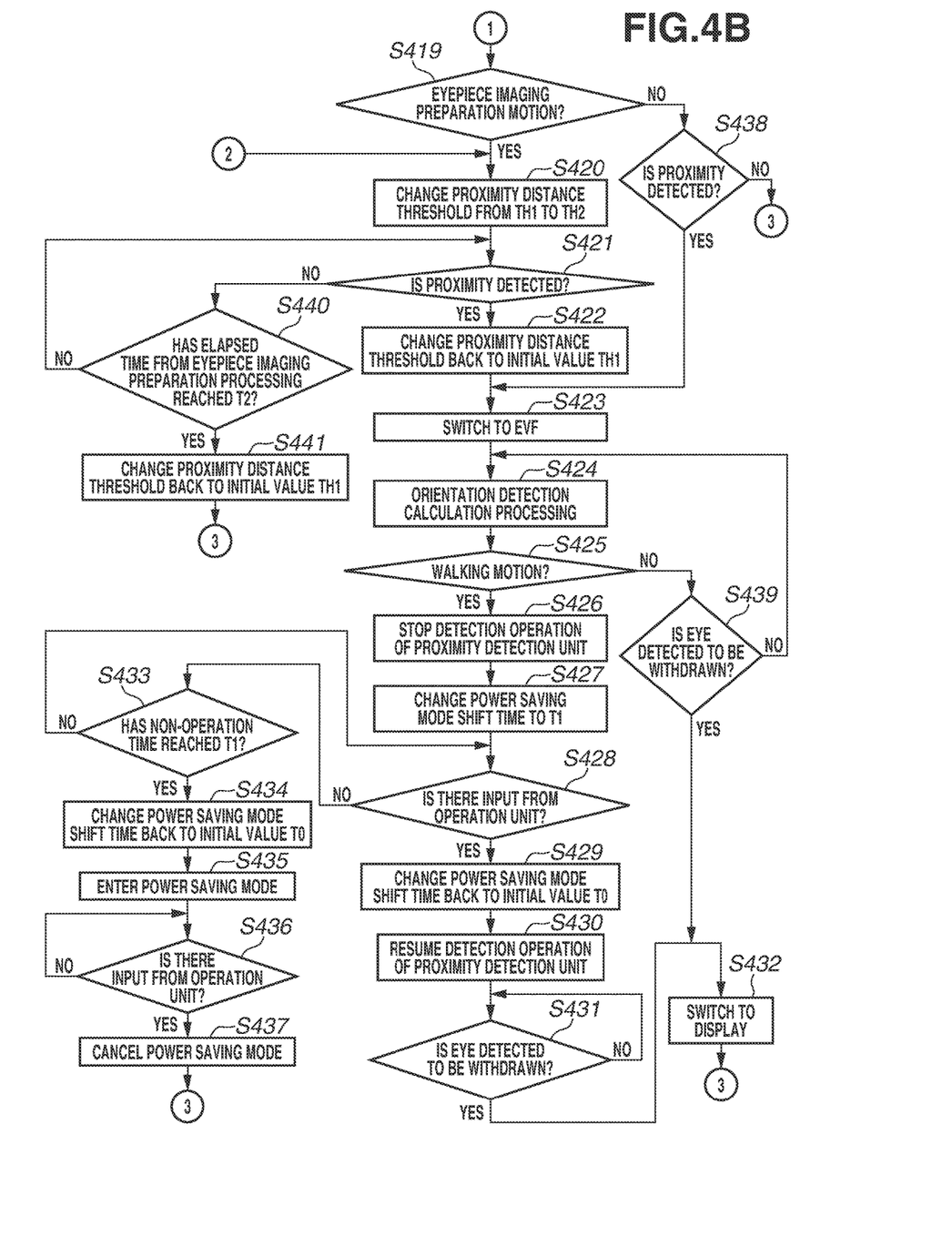
FIG. 4B is an operation flowchart according to the exemplary embodiment.

FIGS. 4A and 4B are flowcharts illustrating an imaging operation according to the present exemplary embodiment. A program for implementing the processing illustrated in FIGS. 4A and 4B is stored in the nonvolatile memory 34. The system control unit 30 reads and loads the program from the nonvolatile memory 34 into the system memory 32, and executes the program. The system control unit 30 thereby implements the processing illustrated in FIGS. 4A and 4B. If the user turns on the power switch 38, the imaging apparatus 10 is activated and the system control unit 30 starts the processing illustrated in FIGS. 4A and 4B.

In step S401, the system control unit 30 activates the orientation detection unit 68 and the proximity detection unit 70, and starts an operation of the orientation detection unit 68 and the proximity detection unit 70. The system control unit 30 starts display on the display 54. For example, the system control unit 30 displays a live view image captured by the image sensor 42 and various types of setting information. The system control unit 30 starts a timer for measuring non-operation time.

In step S402, the system control unit 30 obtains an orientation detection output from the orientation detection unit 68 and performs orientation detection calculation processing. By the orientation detection calculation processing, the system control unit 30 determines whether the user is making a walking motion or an eyepiece imaging preparation motion. If the user is making a walking motion, orientation information obtained from the orientation detection unit 68 oscillates based on the movement of the user's feet. The orientation information then shows periodic, almost constant changes in acceleration in the vertical and horizontal directions. If the user is making an eyepiece imaging preparation motion, as illustrated in FIGS. 5A, 5B, 5C, and 5D, the user quickly moves the imaging apparatus 10 for eyepiece imaging from an on-hand operation state or live view imaging state. As a result, the orientation information includes a large change in acceleration in the vertical or horizontal direction. The system control unit 30 can determine the user motion based on such a difference. For example, if a change or movement greater than or equal to a predetermined amount of change in the vertical or horizontal direction is observed, the system control unit 30 determines that the user is making an eyepiece imaging preparation motion.

In step S403, the system control unit 30 determines whether the determination result in step S402 indicates a walking motion. If the determination result indicates a walking motion (YES in step S403), the processing proceeds to step S404. If not (NO in step S403), the processing proceeds to step S419.

In step S404, the system control unit 30 stops a detection operation of the proximity detection unit 70. The detection operation of the proximity detection unit 70 can be stopped to avoid erroneous detection of the proximity detection unit 70 while the user is walking.

In step S405, the system control unit 30 changes time (a threshold of time) before the imaging apparatus 10 enters a power saving mode (power saving mode shift time) from an initial value T0 to a shorter predetermined time T1. For example, if the initial value T0 of the time before the imaging apparatus 10 enters the power saving mode is 60 seconds, the system control unit 30 sets the predetermined time T1 to shorter time, e.g., 30 seconds. The power saving mode refers to a state in which an operation of some of the functions of the imaging apparatus 10 is stopped. In the power saving mode, standby power of the imaging apparatus 10 can be reduced, compared to a normal operation mode. For example, in the power saving mode, the system control unit 30 hides the display on the display 54 and turns off the backlight 60. Other examples of the power saving mode can include a mode in which the emission intensity of the backlight 60 is reduced to reduce display luminance of display 54, and a mode in which the driving of the touch panel 64 is stopped. By such a control, the imaging apparatus 10 can enter the power saving mode of low power consumption early if the imaging apparatus 10 is not in use, like when the user is holding the imaging apparatus 10 while walking or imaging apparatus 10 is hanging from the user's neck while the user is walking.

In step S406, the system control unit 30 obtains the orientation detection output from the orientation detection unit 68 and performs orientation detection calculation processing. The orientation detection calculation processing is calculation processing for determining whether the user is making preparations for eyepiece imaging in which an eye is brought close to the EVF 56. Here, a situation such that the user looks for an object during walking, finds one, and then makes an eyepiece imaging preparation motion is assumed.

In step S407, the system control unit 30 determines, based on a calculation result of step S406, whether an eyepiece imaging preparation motion is detected. If an eyepiece imaging preparation motion is determined to be detected (YES in step S407), the processing proceeds to step S408. In step S408, the system control unit 30 changes the power saving mode shift time from T1 back to the initial value T0 before change. In step S409, the system control unit 30 resumes the detection operation of the proximity detection unit 70. The processing then proceeds to step S420.

In step S407, if the user is not making an eyepiece imaging preparation motion (NO in step S407), the processing proceeds to step S410. In step S410, the system control unit 30 determines whether there is an input from the operation unit 36. If there is an input from the operation unit 36 (YES in step S410), the processing proceeds to step S411. If there is no input from the operation unit 36 (NO in step S410), the processing proceeds to step S412.

In step S411, the system control unit 30 executes processing based on the operation. The system control unit 30 changes the power saving mode shift time back to the initial value T0, and resets and resumes measurement of the non-operation time. If the operation of the proximity detection unit 70 has stopped, the system control unit 30 resumes the detection operation of the proximity detection unit 70. Examples of the processing based on the operation include processing for changing an imaging setting and imaging processing. After step S411, the processing proceeds to step S417.

In step S412, the system control unit 30 determines whether the non-operation time has reached T1. If the non-operation time has not reached T1 (NO in step S412), the processing returns to step S406. The system control unit 30 then repeats step S406 and subsequent steps. If the non-operation time has reached T1 (YES in step S412), the processing proceeds to step S413.

In step S413, the system control unit 30 changes the power saving mode shift time from T1 back to the initial value T0. In step S414, the system control unit 30 changes the operation mode from the normal operation mode to the power saving mode. This reduces the power consumption of the imaging apparatus 10. The system control unit 30 can stop the operation of the orientation detection unit 68 and the proximity detection unit 70.

In step S415, the system control unit 30 determines whether the operation unit 36 is operated. If the operation unit 36 is not operated (NO in step S415), the processing returns to step S415, whereby the system control unit 30 waits for an operation input from the operation unit 36. If there is an operation input from the operation unit 36 (YES in step S415), the processing proceeds to step S416.

In step S416, the system control unit 30 cancels the power saving mode and enters the normal operation mode. The processing then proceeds to step S417. If the operation of the orientation detection unit 68 and the proximity detection unit 70 has been stopped, the system control unit 30 resumes the operation of the orientation detection unit 68 and the proximity detection unit 70. The system control unit 30 resets and resumes the measurement of the non-operation time.

In step S419, the system control unit 30 determines whether an eyepiece imaging preparation motion is detected. If an eyepiece imaging preparation motion is not detected (NO in step S419), the processing proceeds to step S438. If an eyepiece imaging preparation motion is detected (YES in step S419), the processing proceeds to step S420.

In step S438, the system control unit 30 determines whether proximity is detected by the proximity detection unit 70. The system control unit 30 determines whether an object is closer than a proximity distance threshold TH1. If proximity is detected, i.e., the object is determined to be closer than the proximity distance threshold TH1 (YES in step S438), the processing proceeds to step S423. If not (NO in step S438), the processing proceeds to step S417.

In step S420, the system control unit 30 changes the proximity distance threshold of the proximity detection unit

70 from TH1 to TH2, which is greater than TH1. The purpose is to switch display from the display 54 to the EVF 56 earlier when shifting to eyepiece imaging. The system control unit 30 starts to measure an elapsed time from the eyepiece imaging preparation motion. Determining whether the object is in proximity can be based on the use of something other than the proximity distance itself as a threshold like TH1 and TH2. For example, determining whether the object is in proximity can be based on using thresholds set with respect to the amount of light received by the light receiving element 308. In other words, the thresholds can be the proximity distance thresholds TH1 and TH2, the received amount of light of the light receiving element 308, or other elements as long as the thresholds correspond to large and small proximity distances.

In step S421, the system control unit 30 determines whether the distance detected by the proximity detection unit 70 is closer than the proximity distance threshold, e.g., TH2. If the object is closer than the proximity distance threshold TH2 (YES in step S421), the processing proceeds to step S422. If not (NO in step S421), the processing proceeds to step S440. In step S440, the system control unit 30 determines whether the elapsed time from the eyepiece imaging preparation motion has reached T2. T2 is a threshold of time estimated to be typically needed from when an eye piece imaging preparation motion is made to when the viewing window is viewed through. For example, T2 is set to approximately 1 second. If the elapsed time from the eyepiece imaging preparation motion has reached T2 (YES in step S440), i.e., if proximity is not detected within T2, the processing proceeds to step S441. If not (NO in step S440), the processing returns to step S421.

In step S441, the system control unit 30 changes the proximity distance threshold of the proximity detection unit 70 back to the initial value TH1. The processing then proceeds to step S417. If proximity is not detected by the proximity detection unit 70 within T2 from the eyepiece imaging preparation motion, the motion detected in step S419 may not be the motion for making preparations for eyepiece imaging. The system control unit 30 then changes the proximity distance threshold back to the initial value TH1.

In step S422, the system control unit 30 changes the proximity distance threshold of the proximity detection unit 70 back to the initial value TH1. In step S423, the system control unit 30 switches display from the display 54 to the EVF 56. More specifically, the system control unit 30 hides display on the display 54 and drives the EVF 56 for display. For example, the EVF 56 displays a live view image captured by the image sensor 42 and various types of setting information.

In step S424, the system control unit 30 obtains orientation detection information output from the orientation detection unit 68, and performs calculation processing for determining whether the user is making a walking motion. In step S425, the system control unit 30 determines whether a walking motion is detected from the calculation result of step S424. If a walking motion is detected (YES in step S425), the processing proceeds to step S426. If no walking motion is detected (NO in step S425), the processing proceeds to step S439.

In step S439, the system control unit 30 determines, based on the detection output of the proximity detection unit 70, whether the user withdraws the user's eye from the EVF 56. In step S439, if withdrawal of the user's eye is detected (YES in step S439), the processing proceeds to step S432. If withdrawal of the user's eye is not detected (NO in step S439), the processing returns to step S424. In step S424, the system control unit 30 determines again whether the user is making a walking motion. To detect withdrawal of the user's eye in step S439, the proximity detection unit 70 detects that the object changes from the state of being in proximity to a state of not being in proximity. The user's eye can be determined to be withdrawn if the object is separated from the proximity detection unit 70 by more than the same proximity distance threshold TH1 as that during proximity detection. The user's eye can be determined to be withdrawn if the object is separated by a distance having hysteresis with respect to the proximity distance threshold TH1.

In step S426, the system control unit 30 stops the detection operation of the proximity detection unit 70. In step S427, the system control unit 30 changes the threshold of the power saving mode shift time of the imaging apparatus 10 from the initial value T0 to the shorter value T1.

In step S428, the system control unit 30 determines an input operation from the operation unit 36. If there is an input from the operation unit 36 (YES in step S428), the processing proceeds to step S429. Here, a situation in which the user walks during eyepiece imaging is assumed. If there is no input from the operation unit 36 (NO in step S428), the processing proceeds to step S433. Here, a situation is presumed in which the user walks with the imaging apparatus 10 not in use, i.e., around the user's neck.

In step S429, the system control unit 30 changes the threshold of the power saving mode shift time back to the initial value T0, and resets and resumes the measurement of the non-operation time. The system control unit 30 also executes processing based on the input operation from the operation unit 36 (for example, processing for changing an imaging setting and imaging processing). In step S430, the system control unit 30 resumes the operation of the proximity detection unit 70.

In step S431, the system control unit 30 waits until the user's eye is detected to be withdrawn based on the proximity detection output of the proximity detection unit 70. In step S431, if the user's eye is detected to be withdrawn (YES in step S431), the processing proceeds to step S432.

In step S432, the system control unit 30 switches display from the EVF 56 to the display 54. More specifically, the system control unit 30 stops driving and hides the display on the EVF 56, and drives the display 54 into a displayable state. For example, the display 54 displays a live view image captured by the image sensor 42 and various types of setting information.

In step S428, if there is no input operation from the operation unit 36 (NO in step S428), the processing proceeds to step S433. In step S433, the system control unit 30 determines whether the non-operation time has reached T1. If the non-operation time has not reached T1 (NO in step S433), the processing returns to step S428. If the non-operation time has reached T1 (YES in step S433), the processing proceeds to step S434.

In step S434, the system control unit 30 changes the threshold of the power saving mode shift time from T1 back to the initial value T0. In step S435, the system control unit 30 changes the operation mode from the normal operation mode to the power saving mode. In step S436, the system control unit 30 waits for an input from the operation unit 36. If there is an input from the operation unit 36 (YES in step S436), the processing proceeds to step S437. In step S437, the system control unit 30 cancels the power saving mode and enters the normal operation mode. If the operation of the orientation detection unit 68 and the proximity detection unit 70 has been stopped, the system control unit 30 resumes the operation of the orientation detection unit 68 and the proximity detection unit 70. The system control unit 30 also resets and resumes the measurement of the non-operation time.

In step S417, the system control unit 30 determines whether the power switch 38 is turned off. If the power switch 38 is not turned off (NO in step S417), the processing returns to step S402. The system control unit 30 then performs step S402 and subsequent steps again. If the power switch 38 is turned off (YES in step S417), the system control unit 30 turns off the power of the camera main body 12.

FIGS. 5A, 5B, 5C, and 5D are schematic diagrams illustrating a relationship between state transitions among an initial state before eyepiece imaging, detection of a swing-up motion, detection of a drawing motion, and thresholds.

Figure 5A:
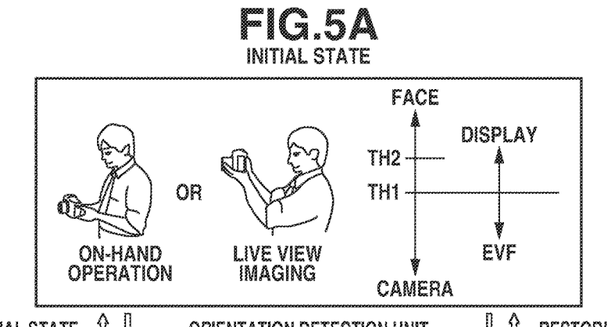
FIGS. 5A, 5B, 5C, and 5D are state transition diagrams according to the exemplary embodiment.
Figure 5B:
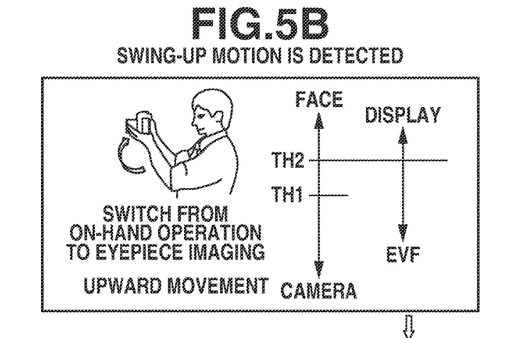
Figure 5C:
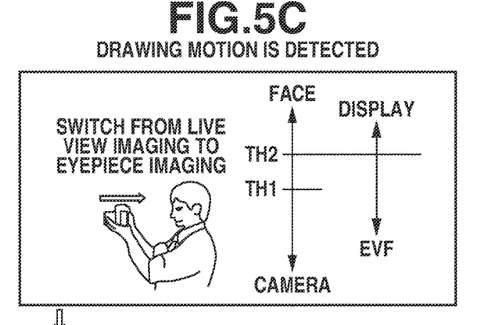
Figure 5D:
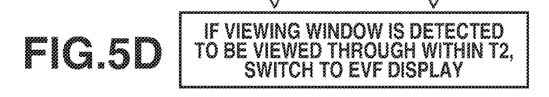

In the initial state before eyepiece imaging, as illustrated in FIG. 5A, an on-hand operation or live view imaging is assumed. When shifting from an on-hand operation state illustrated in FIG. 5A to eyepiece imaging, the user makes a swing-up motion as illustrated in FIG. 5B. A large change in acceleration in a vertically upward direction is observed as an eyepiece imaging preparation motion. When shifting from a live view imaging state to eyepiece imaging, the user makes a drawing motion as illustrated in FIG. 5C. A large change in acceleration in a horizontally approaching direction is observed as an eyepiece imaging preparation motion.

During the motions illustrated in FIGS. 5B and 5C, if the orientation detection unit 68 detects the eyepiece imaging preparation motion, the proximity distance threshold of the proximity detection unit 70 is changed from the initial value TH1 to the greater TH2 value. Proximity can thus be detected earlier than if the proximity distance threshold is kept at the threshold TH1. If proximity is not detected within the predetermined time T2 in the state illustrated in FIG. 5B or 5C, the detection is assumed to be erroneous and the state is restored to the initial state illustrated in FIG. 5A. If proximity is detected within the time T2, display is switched to the EVF 56. This can reduce the display switching time. If proximity is detected within the time T2 in the state illustrated in FIG. 5B or 5C, the state is switched to a state illustrated in FIG. 5D (display by the EVF 56).

If the orientation detection unit 68 detects a walking motion in step S403 or S425, the system control unit 30 stops the detection operation of the proximity detection unit 70. This can avoid erroneous detection of the proximity detection unit 70 during a walking motion. Searching between detection and non-detection of proximity by the proximity detection unit 70 due to the swinging of the camera main body 12 in a walking motion can be prevented, and thus, frequent switching of display between the EVF 56 and the display 54 can be prevented. If a walking motion is detected, the power saving mode shift time can be changed to reduce the power consumption when the imaging apparatus 10 is not in use.

The proximity detection operation of the proximity detection unit 70 does not need to be stopped if a walking motion is detected. Instead, the switching of display (driving) and hiding (driving stopped) of the EVF 56 and the display 54 based on the detection result can be disabled.

In the present exemplary embodiment, if the user makes an eyepiece imaging preparation motion, the proximity distance threshold of the proximity detection unit 70 can be changed to reduce the switching time of display from the display 54 to the EVF 56.

When the user makes a walking motion, the detection operation of the proximity detection unit 70 can be stopped and the power saving mode shift time can be changed to reduce the power consumption when the imaging apparatus 10 is not in use.

The present exemplary embodiment has been described by using the imaging apparatus 10 including two display units, the EVF 56 and the display 54 as an example. However, an exemplary embodiment can be applied to any electronic apparatus that includes at least one display unit.

The proximity detection unit 70 is described to use the infrared projection and reception-based proximity detection method. However, the proximity detection unit 70 can use capacitive and other methods. The orientation detection unit 68 is described to use an acceleration sensor. However, sensors of other detection methods, such a gyro sensor, can be used.

The present invention is not limited to an imaging apparatus. An exemplary embodiment is applicable to any electronic apparatus including a display unit or units that perform similar control.

The above-described various types of controls performed by the system control unit 30 can be performed by a single piece of hardware. A plurality of pieces of hardware can share processing to control the entire imaging apparatus.

In the above-described exemplary embodiment, the threshold of proximity detection is described to be changed based on orientation. In more general terms, the threshold of proximity detection can be changed based on a motion of the camera main body 12 or a degree thereof. In such a case, the orientation detection unit can be read as a motion detection unit.

The above-described exemplary embodiment is not seen to be limiting, and various modes not departing from the essence of the exemplary embodiment are applicable. The above-described exemplary embodiment is just one exemplary embodiment, and various exemplary embodiments can be combined as appropriate.

The above-described exemplary embodiment discusses an example where an imaging apparatus includes two display units. However, an exemplary embodiment is applicable to any electronic apparatus that includes a display unit or display units and controls display on the display unit(s) based on proximity. More specifically, an exemplary embodiment is applicable to a personal computer, a personal digital assistant (PDA), a mobile phone terminal, a portable image viewer, a printer, a digital photo frame, a music player, a game machine, an electronic book reader, a tablet terminal, a smartphone, and a projection apparatus.

According to an exemplary embodiment, display can be appropriately controlled based on proximity detection.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-109669, filed Jun. 1, 2016, which is hereby incorporated by reference herein in its entirety.

What is claimed is:

1. An electronic apparatus comprising:
a motion detector configured to detect a motion of the electronic apparatus;
a proximity detector configured to detect proximity of an object;
a display configured to be viewable when viewed through an eyepiece part; and
a memory and at least one processor to perform the operations of the following unit:
a control unit configured to, in a case where proximity detection information from the proximity detector corresponds to a distance closer than a threshold, perform control to start display on the display, and configured to, in a case where the motion detector detects a first motion, change the threshold to a value corresponding to a greater distance,
wherein the control unit is configured to, in a case where the proximity detector does not detect proximity before a predetermined time elapses after the first motion is detected, perform control to change the threshold back to a value before change.

2. The electronic apparatus according to claim 1, wherein the first motion is a motion of a user moving the electronic apparatus to view through the eyepiece part.

3. The electronic apparatus according to claim 2, wherein the first motion is a motion including a predetermined amount or more of change in a vertical direction or a horizontal direction.

4. The electronic apparatus according to claim 1, wherein the control unit is configured to, in a case where the motion detector detects a second motion that is different from the first motion, stop a detection operation of the proximity detector or stop the control of the display on the display based on a detection result from the proximity detector.

5. The electronic apparatus according to claim 4, wherein the second motion is a motion of the electronic apparatus when a user is walking with the electronic apparatus.

6. The electronic apparatus according to claim 4, wherein the second motion is a periodic motion in a vertical direction or a horizontal direction.

7. The electronic apparatus according to claim 4, wherein the control unit is configured to, if the motion detector detects the second motion, reduce a threshold of a non-operation time before the electronic apparatus enters a power saving mode.

8. The electronic apparatus according to claim 4, wherein the control unit is configured to, if a user makes an operation after the detection operation of the proximity detector is stopped or after the control of the display on the display based on the detection result from the proximity detector is stopped, resume the detection operation of the proximity detector or resume the control of the display on the display based on the detection result from the proximity detector.

9. The electronic apparatus according to claim 4, wherein the control unit is configured to, if the motion detector detects the first motion after the detection operation of the proximity detector is stopped or after the control of the display on the display based on the detection result from the proximity detector is stopped, resume the detection operation of the proximity detector or resume the control of the display on the display based on the detection result from the proximity detector.

10. The electronic apparatus according to claim 1, wherein the control unit is configured to, in a case where the proximity detection information from the proximity detector indicates a distance farther than a predefined threshold while the display performs display, performs control to end the display, wherein the predefined threshold for ending the display is a threshold irrelevant to whether the motion detector detects the first motion.

11. The electronic apparatus according to claim 1, further comprising a second display that is different from the display, the second display being configured to be viewable without viewing through the eyepiece part,
wherein the control unit is configured to switch display on the second display to the display on the display based on proximity detection by the proximity detector, and switch the display on the display to the display on the second display based on to non-detection of proximity by the proximity detector.

12. The electronic apparatus according to claim 1, wherein the electronic apparatus is an imaging apparatus including an imaging unit.

13. A method for controlling an electronic apparatus including a motion detector that detects a motion, a proximity detector that detects proximity of an object, and a display that is viewable when viewed through an eyepiece part, the method comprising:
performing control to start display on the display in a case where proximity detection information from the proximity detector corresponds to a distance closer than a threshold; and
changing the threshold to a value corresponding to a greater distance in a case where the motion detector detects a first motion,
wherein in a case where the proximity detector does not detect proximity before a predetermined time elapses after the first motion is detected, perform control to change the threshold back to a value before change.

14. A non-transitory computer-readable storage medium storing computer executable instructions for causing a computer to execute a method for controlling an electronic apparatus including a motion detector that detects a motion, a proximity detector that detects proximity of an object, and a display that is viewable when viewed through an eyepiece part, the method comprising:
performing control to start display on the display in a case where proximity detection information from the proximity detector corresponds to a distance closer than a threshold; and changing the threshold to a value corresponding to a greater distance in a case where the motion detector detects a first motion, wherein in a case where the proximity detector does not detect proximity before a predetermined time elapses after the first motion is detected, perform control to change the threshold back to a value before change.

* * * * *